United States Patent
Matsuda et al.

(10) Patent No.: US 11,212,404 B2
(45) Date of Patent: Dec. 28, 2021

(54) IMAGE FORMING APPARATUS

(71) Applicant: KONICA MINOLTA, INC., Tokyo (JP)

(72) Inventors: Hideyuki Matsuda, Hirakata (JP); Akira Murakawa, Toyonaka (JP); Atsushi Kawai, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 39 days.

(21) Appl. No.: 16/939,519

(22) Filed: Jul. 27, 2020

(65) Prior Publication Data

US 2021/0075928 A1    Mar. 11, 2021

(30) Foreign Application Priority Data

Sep. 5, 2019  (JP) .............................. JP2019-162064

(51) Int. Cl.
*H04N 1/08*  (2006.01)
*H04N 1/00*  (2006.01)

(52) U.S. Cl.
CPC ..... *H04N 1/00689* (2013.01); *H04N 1/00639* (2013.01); *H04N 1/00716* (2013.01); *H04N 1/00724* (2013.01)

(58) Field of Classification Search
CPC ........... H04N 1/00689; H04N 1/00639; H04N 1/00716
See application file for complete search history.

(56) References Cited

U.S. PATENT DOCUMENTS

2013/0335475 A1*  12/2013  Yano ..................... B41J 11/485
                                                                     347/16
2016/0231969 A1*  8/2016   Kashiwagi ............ G06F 3/1253

FOREIGN PATENT DOCUMENTS

JP          2017170859 A    9/2017
JP          2017193390 A    10/2017

* cited by examiner

*Primary Examiner* — Ibrahim Siddo
(74) *Attorney, Agent, or Firm* — Buchanan Ingersoll & Rooney PC

(57) ABSTRACT

An image forming apparatus includes: a reception part that receives specification of a print mode and specification of a sheet type to be used for printing; a sheet supply part that sends a sheet to a sheet conveyance path; a detection part that detects a type of a sheet sent to the sheet conveyance path; and a hardware processor that controls a printing operation, wherein when a sheet type received by the reception part is a type for which printing in the print mode received by the reception part is allowed, the sheet supply part sends a sheet to the sheet conveyance path, the hardware processor determines whether or not the print mode received by the reception part is a prohibition mode, when it is determined that the print mode is the prohibition mode, the detection part detects a type of a sheet sent to the sheet conveyance path.

10 Claims, 15 Drawing Sheets

FIG. 7

| SHEET TYPE / PRINT MODE | PAPER/ PLAIN PAPER (Eco) | THIN PAPER | OHP | ENVELOPE | THICK PAPER 1 | THICK PAPER 1+ | THICK PAPER 2 | THICK PAPER 3 | THICK PAPER 4 Q |
|---|---|---|---|---|---|---|---|---|---|
| SINGLE-SIDED MODE | ○ | ○ | ○ | ○ | ○ | ○ | ○ | ○ | ○ |
| AUTO-COLOR MODE | ○ | ○ | ○ | ○ | ○ | ○ | ○ | ○ | ○ |
| FULL-COLOR MODE | ○ | ○ | ○ | ○ | ○ | ○ | ○ | ○ | ○ |
| TWO-COLOR MODE | ○ | ○ | ○ | ○ | ○ | ○ | ○ | ○ | ○ |
| MONOCHROME MODE | ○ | ○ | ○ | ○ | ○ | ○ | ○ | ○ | ○ |
| DOUBLE-SIDED MODE | ○ | ○ | × | × | × | × | × | ○ | × |
| STAPLE MODE | ○ | ○ | × | × | × | × | × | × | × |
| PUNCHING MODE | ○ | ○ | × | × | × | × | × | × | × |
| FOLDING MODE (FOR EACH SET) | ○ | ○ | × | × | ○ | ○ | ○ | × | × |
| FOLDING MODE (FOR EACH SHEET) | ○ | ○ | × | × | × | × | × | × | × |
| CUTTING MODE | ○ | ○ | × | × | ○ | ○ | ○ | ○ | × |
| INSERT SHEET PRINTING MODE | ○ | ○ | × | × | ○ | ○ | ○ | ○ | × |

IMAGE FORMING APPARATUS

The entire disclosure of Japanese patent Application No. 2019-162064, filed on Sep. 5, 2019, is incorporated herein by reference in its entirety.

BACKGROUND

Technological Field

The present disclosure relates to an image forming apparatus.

Description of the Related Art

An image forming apparatus has various print modes, including a mode that allows printing regardless of a sheet type, and a mode that prohibits printing on a sheet of a specific type (hereinafter referred to as "prohibition mode"). When a staple mode that prohibits printing on thick paper is specified, if a fed sheet is thick paper, stapling processing is not to be performed correctly, and the image forming apparatus itself may also be damaged. On the other hand, a technique is known in which a sensor detects a sheet type at a start of a print job, and the print job is started after confirmation that the sheet is not a type prohibited for printing.

JP 2017-193390 A discloses a technique capable of determining a type of a sheet being conveyed in an early stage after the start of the conveyance (see Abstract).

JP 2017-170859 A discloses a technique for improving usability even when a set type of sheets does not accord with a type of sheets stored in a storage means (see Abstract).

According to the technology disclosed in JP 2017-193390 A or JP 2017-170859 A, an image forming apparatus always detects a sheet type at a start of a print job. As a result, printing productivity is deteriorated. Further, according to the technology disclosed in JP 2017-193390 A or JP 2017-170859 A, when a type of a fed sheet is different from a specified sheet type, the print job is stopped even if the type of the fed sheet is a type that can be printed in the specified print mode. In such a case, the print job is not to be restarted unless a user performs reinsertion or the like of correct paper, which is inconvenience for the user.

SUMMARY

The present disclosure has been made in view of such circumstances, and an object is to avoid printing on a sheet type for which printing is prohibited, without deterioration of printing productivity and user convenience as much as possible.

To achieve the abovementioned object, according to an aspect of the present invention, an image forming apparatus reflecting one aspect of the present invention comprises: a reception part that receives specification of a print mode and specification of a sheet type to be used for printing; a sheet supply part that sends a sheet to a sheet conveyance path; a detection part that detects a type of a sheet sent to the sheet conveyance path; and a hardware processor that controls a printing operation, wherein when a sheet type received by the reception part is a type for which printing in the print mode received by the reception part is allowed, the sheet supply part sends a sheet to the sheet conveyance path, the hardware processor determines whether or not the print mode received by the reception part is a prohibition mode that prohibits printing on a sheet of a specific type, when it is determined that the print mode received by the reception part is the prohibition mode, the detection part detects a type of a sheet sent to the sheet conveyance path, and the hardware processor executes a printing operation when the print mode received by the reception part is the prohibition mode, and a sheet type detected by the detection part is a type for which printing in the prohibition mode is allowed, and executes a printing operation without being based on detection by the detection part when the print mode received by the reception part is not the prohibition mode.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 7 is a view showing a table summarizing prohibition relationships between print modes and sheet types;

DETAILED DESCRIPTION OF EMBODIMENTS

Figure 1:
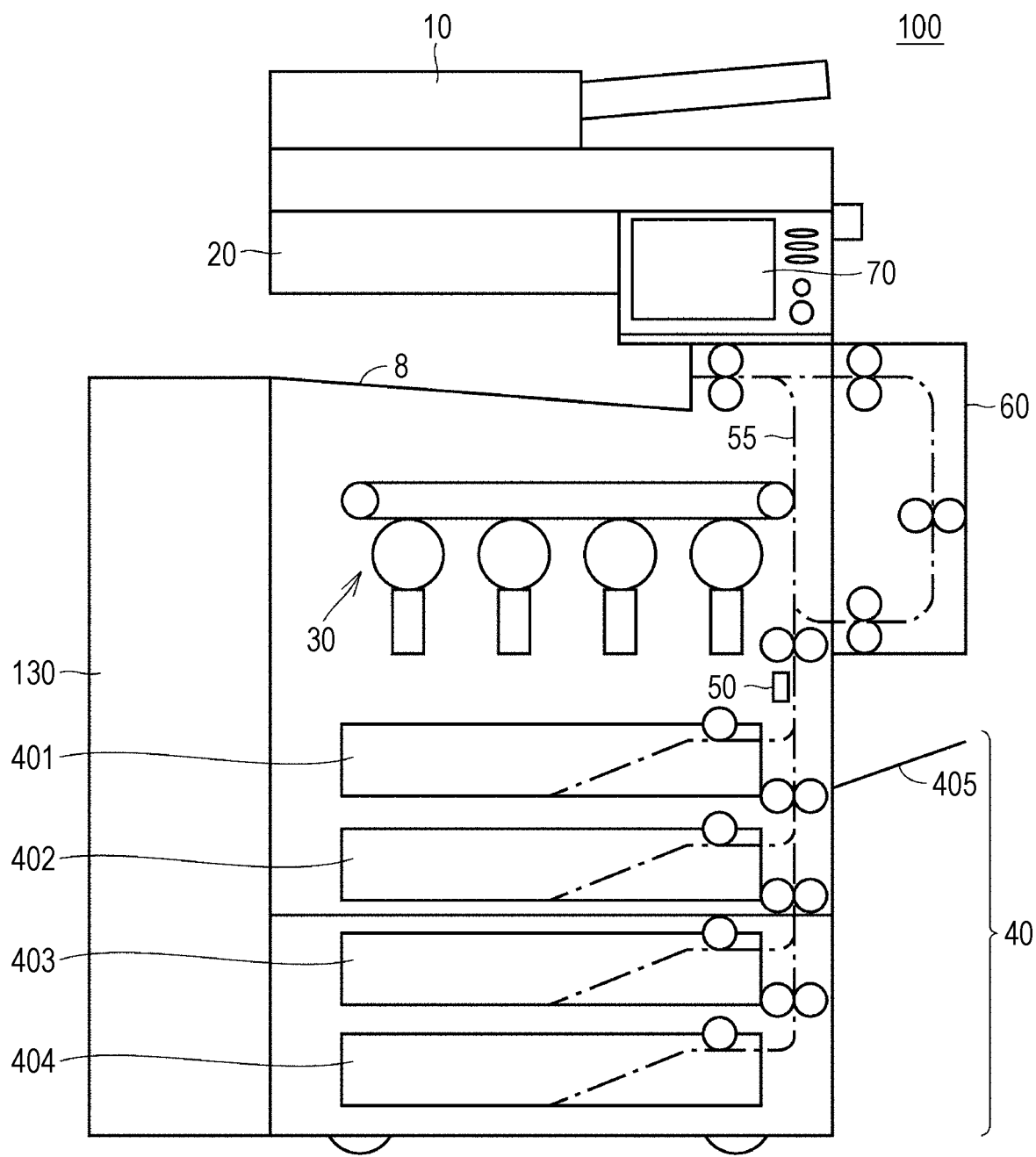
FIG. 1 is a view showing an overall view of an image forming apparatus.

Hereinafter, one or more embodiments of the present invention will be described with reference to the drawings. However, the scope of the invention is not limited to the disclosed embodiments. Note that the same or corresponding parts in the drawings are denoted by the same reference numerals and the description thereof will not be repeated.

Figure 2:
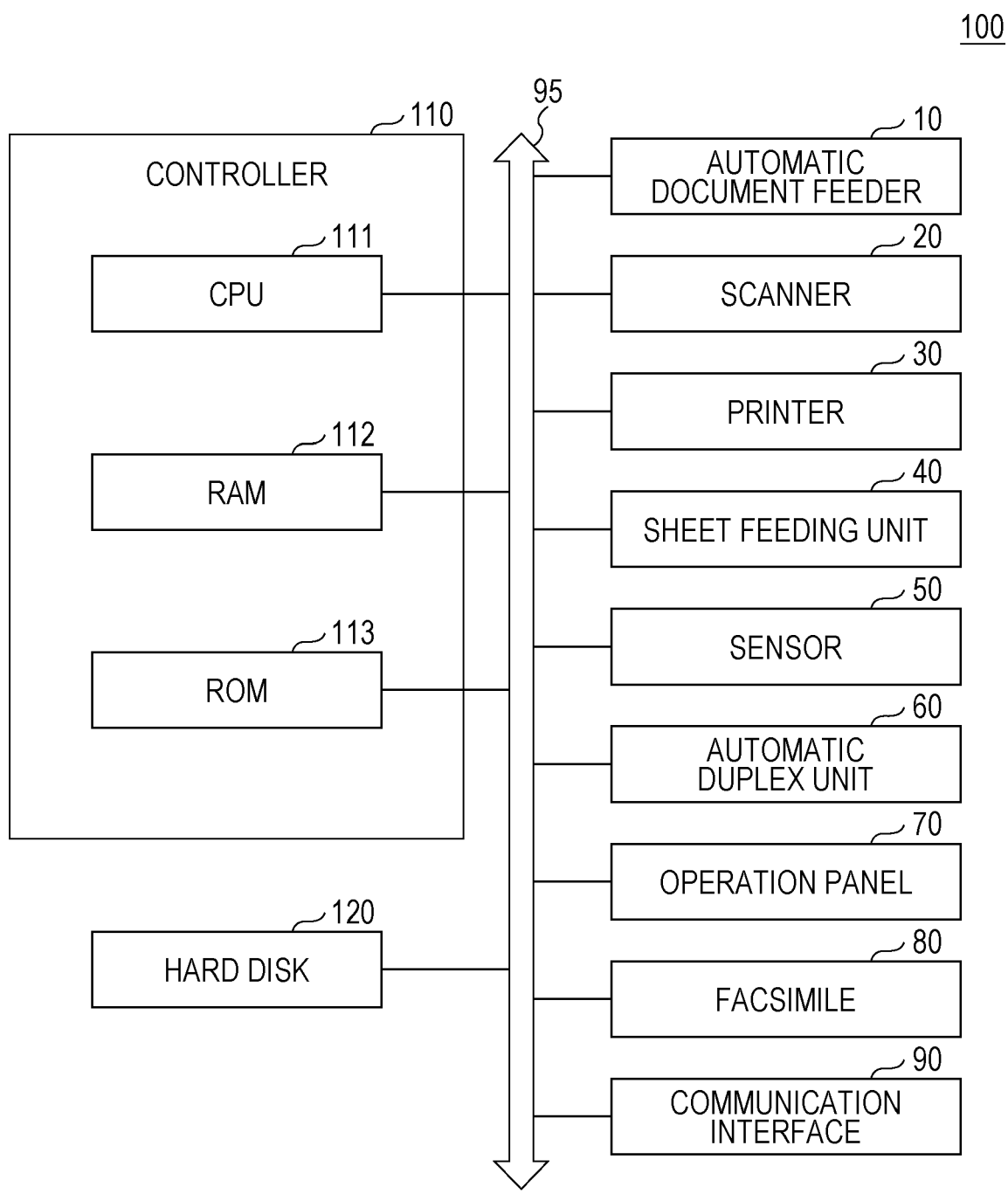
FIG. 2 is a diagram showing a hardware configuration of the image forming apparatus.

An overall configuration of an image forming apparatus 100 will be described with reference to FIGS. 1 and 2. FIG. 1 is a view showing an overall view of the image forming apparatus 100. FIG. 2 is a diagram showing a hardware configuration of the image forming apparatus 100. The image forming apparatus 100 is a multi function peripheral (MFP) equipped with a plurality of functions such as a scanner function, a copy function, a facsimile function, a network function, and a BOX function. The image forming apparatus 100 is connected to a post-processing device 130 that performs stapling processing, folding processing, punching processing, or cutting processing on a printed sheet. Note that the image forming apparatus 100 is not limited to the multi function peripheral, but may be mounted in any form such as a copying machine, a printer, or a facsimile. Further, the image forming apparatus 100 may not be connected to the post-processing device 130.

The image forming apparatus 100 includes an automatic document feeder 10, a scanner 20, a printer 30, a sheet feeding unit 40, a sensor 50, an automatic duplex unit 60, an operation panel 70, a facsimile 80, a communication interface 90, a controller 110, and a hard disk 120. The automatic document feeder 10, the scanner 20, the printer 30, the sheet feeding unit 40, the sensor 50, the automatic duplex unit 60, the operation panel 70, the facsimile 80, the communication interface 90, the controller 110, and the hard disk 120 are connected via a bus 95.

The automatic document feeder 10 conveys a plurality of documents one by one to the scanner 20.

The scanner 20 optically reads and converts a document into an image.

The printer 30 prints an image on a sheet. The printer 30 includes a photoreceptor drum and an exposure device that are for forming yellow, magenta, cyan, and black toner images. The printer 30 superimposes and transfers the toner images of the individual colors on a transfer belt, and transfers the superimposed toner images onto a sheet conveyed from the sheet feeding unit 40. The sheet on which the toner images are transferred is discharged to a sheet discharging tray 8. Hereinafter, a series of processes performed by the printer 30 will be referred to as "printing process".

The sheet feeding unit 40 sends sheets stored in a sheet feeding tray 401, 402, 403, or 404 or a manual feeding tray 405 one by one to a sheet conveyance path 55 on the basis of a print instruction. Note that the sheets stored in the sheet feeding trays 401, 402, 403, and 404 or the manual feeding tray 405 are not limited to plain paper. Thin paper, an overhead projector (OHP) film, an envelope, or thick paper may be stored in the sheet feeding trays 401, 402, 403, and 404 or the manual feeding tray 405.

The sensor 50 detects a type of the sheet sent to the sheet conveyance path 55.

The automatic duplex unit 60 enables double-sided printing. The automatic duplex unit 60 reverses front and back of the sheet.

The operation panel 70 includes a touch panel display and various buttons. The operation panel 70 receives an input operation by a user. On the touch panel display, various setting screens and notifications to the user are displayed.

The facsimile 80 is connected to a telephone line, and transmits and receives image data to and from another device.

The communication interface 90 communicates with another device via a network.

The controller 110 includes a central processing unit (CPU) 111, a random access memory (RAM) 112, and a read only memory (ROM) 113. The CPU 111 executes an operation program stored in the ROM 113 or the like to collectively control the entire image forming apparatus 100. The ROM 113 stores a program executed by the CPU 111, and other data. The RAM 112 serves as a work area when the CPU 111 executes the program, and temporarily stores the program, data when executing the program, and the like.

The hard disk 120 stores a program and various data. The various data are, for example, image data.

Figure 3:
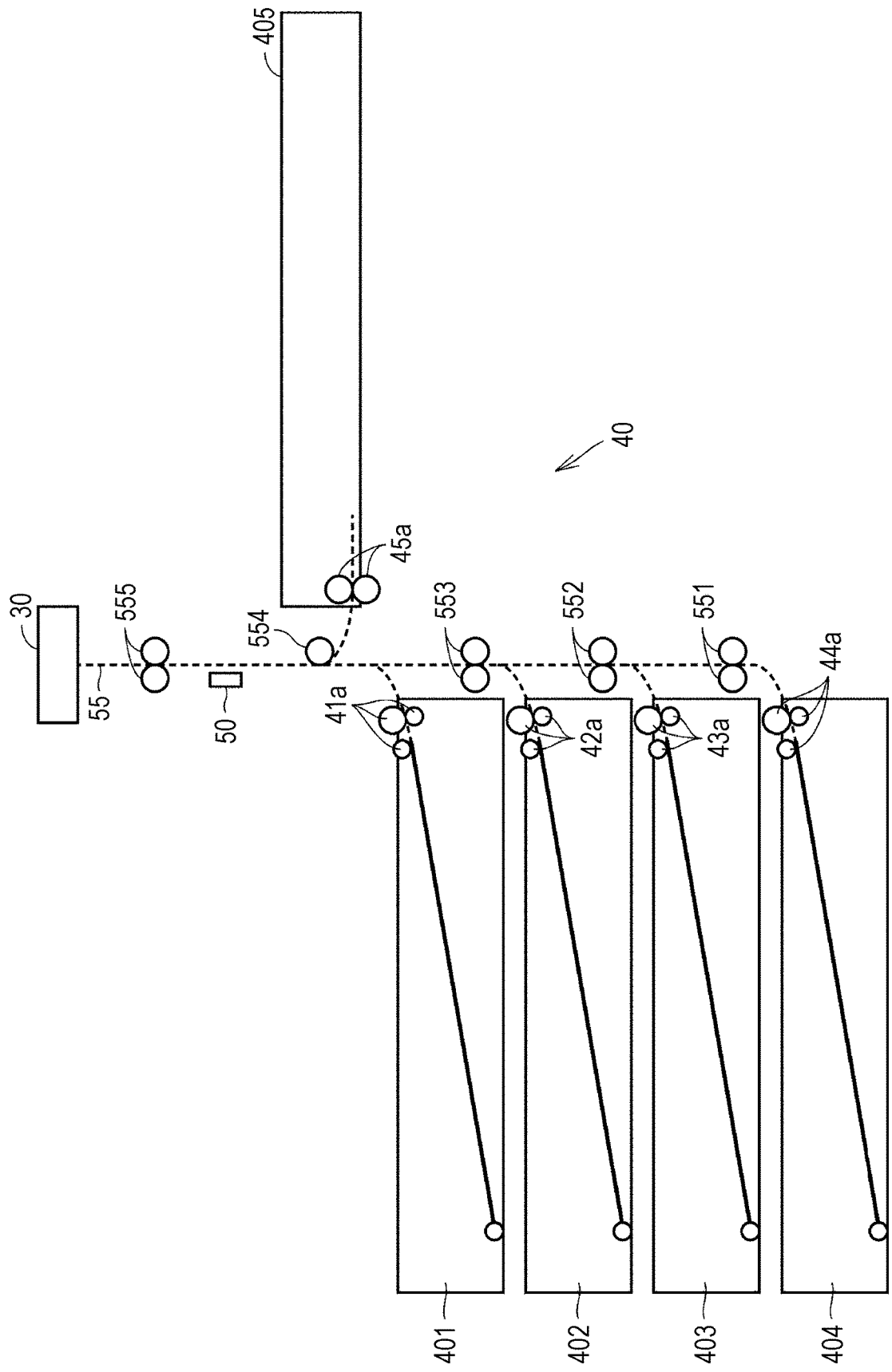
FIG. 3 is a view showing a sheet feeding unit and a sensor.

FIG. 3 is a view showing the sheet feeding unit 40 and the sensor 50. When a user instructs printing on the operation panel 70, the controller 110 sends sheets stored in the sheet feeding tray 401, 402, 403, or 404 or the manual feeding tray 405 one by one to the sheet conveyance path 55. The user specifies, in advance on the operation panel 70, from which tray the sheet is to be sent to the sheet conveyance path 55. Specifically, on the operation panel 70, the user specifies a tray or a sheet type to be used for printing. When the user specifies a tray, the controller 110 rotates a roller 41a, 42a, 43a, 44a, or 45a corresponding to the specified tray. Whereas, when the user specifies a sheet type, the controller 110 refers to tray information shown in FIG. 4 to identify a tray that stores sheets of the type specified by the user, and rotates the roller 41a, 42a, 43a, 44a, or 45a corresponding to the specified tray. This causes the sheets to be sent one by one to the sheet conveyance path 55. Thereafter, the sheet is conveyed to the printer 30 by rollers 551, 552, 553, 554, and 555.

The sensor 50 is provided on a path along which the sheet is conveyed from the sheet feeding unit 40 to the printer 30. When a print mode specified by the user is a prohibition mode that prohibits printing on a sheet of a specific type, the sensor 50 detects a type (thickness, and the like) of the conveyed sheet. Whereas, the sensor 50 does not detect the sheet type when the print mode specified by the user is not the prohibition mode.

In this way, when the user specifies a print mode and a type of a sheet to be used for printing on the operation panel 70, and then instructs printing, sheets are sent from the sheet feeding unit 40 one by one to the sheet conveyance path 55 and conveyed to the printer 30. When the print mode specified by the user is the prohibition mode, the sensor 50 detects a type of the sheet conveyed toward the printer 30.

Figure 4:
FIG. 4 is a view showing a table summarizing tray information.

The tray information will be described with reference to FIGS. 4 and 5. FIG. 4 is a view showing a table P summarizing the tray information. The tray information is information in which trays and types of sheets stored in the trays are associated with each other, and is registered by the user on the operation panel 70. The table P is stored in a non-volatile area (for example, the ROM 113, the hard disk 120) of the image forming apparatus 100.

Figure 5:
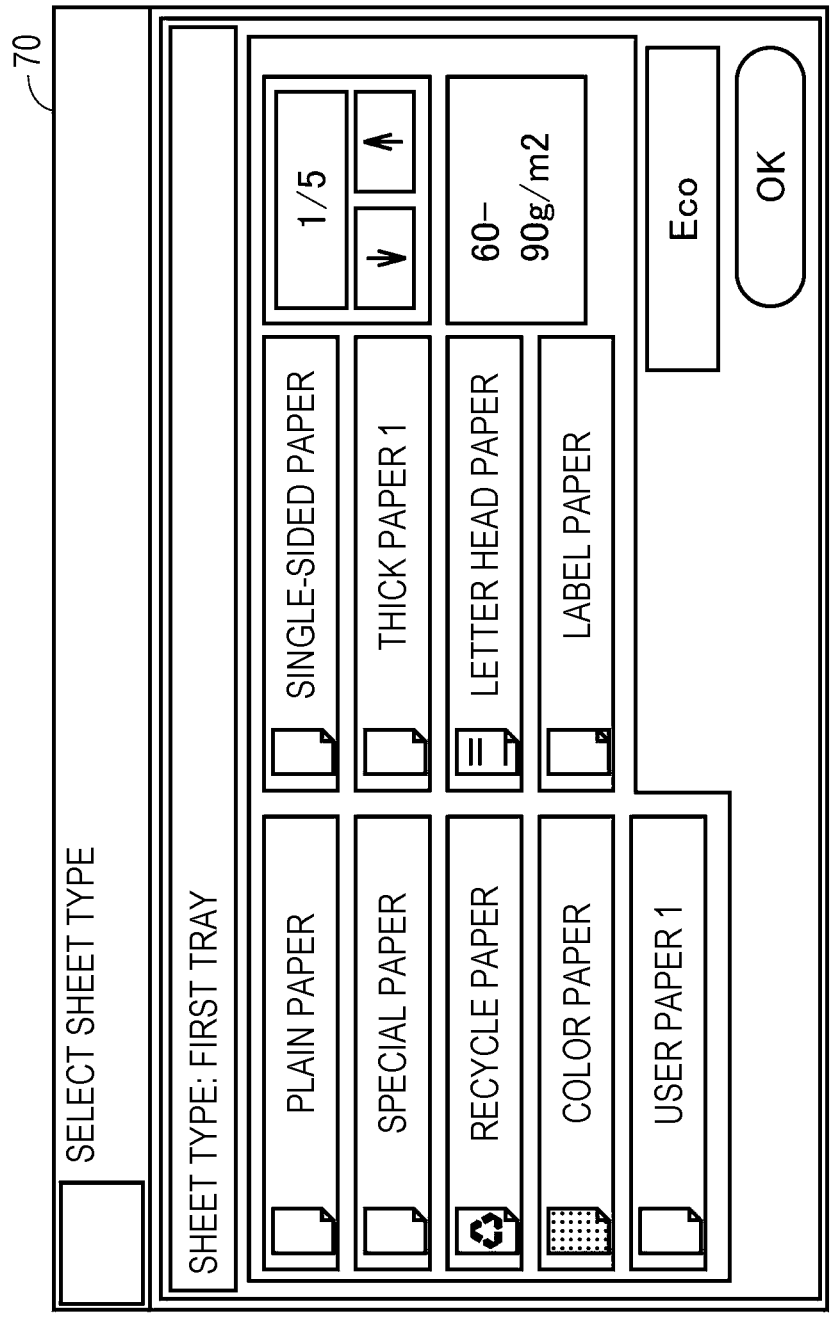
FIG. 5 is a view showing a registration screen for registration of tray information.

FIG. 5 is a view showing a registration screen for registration of the tray information. The registration screen is a screen for registration of types of sheets stored in the sheet feeding trays 401, 402, 403, and 404 or the manual feeding tray 405. The registration screen is displayed on the operation panel 70. FIG. 5 shows a screen for registration of a type of sheets stored in a first tray, that is, the sheet feeding tray 401. The user presses "OK" after selecting the type of sheets stored in the sheet feeding tray 401. This associates the type of sheets stored in the sheet feeding tray 401 with the table P. When the user desires to register a type of sheets stored in the sheet feeding tray 402, 403, or 404 or the manual feeding tray 405, the user can simply switch the registration screen to the registration screen of the tray desired to be registered.

Figure 6:
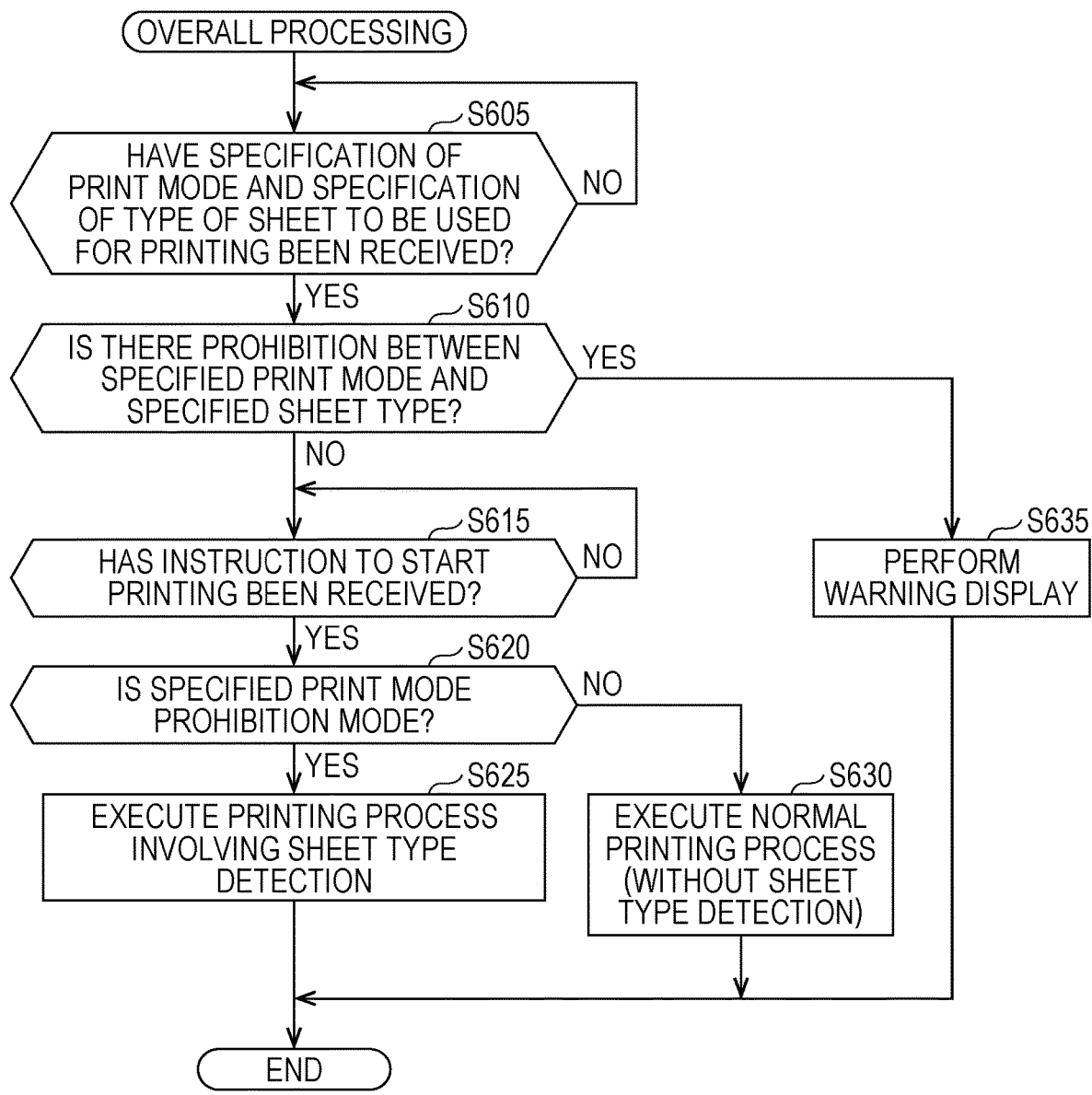
FIG. 6 is a flowchart showing overall processing by a controller.

Overall processing by the controller 110 will be described with reference to FIGS. 6 and 7. FIG. 6 is a flowchart showing the overall processing by the controller 110. The processing shown in FIG. 6 is realized by the CPU 111 executing a predetermined program stored in the ROM 113.

First, with reference to FIG. 6, the controller 110 determines whether or not specification of a print mode and specification of a type of a sheet to be used for printing have been received (step S605). The user can specify the print mode and the type of the sheet to be used for printing on the operation panel 70. The operation panel 70 displays a screen for selection of a print mode and a screen for selection of a type of a sheet to be used. The screen for selection of a type of a sheet to be used may be a screen for selection of a type of the sheet itself or a screen for selection of a tray that stores the sheets. When the user selects the tray that stores the sheets, the controller 110 refers to the table P and identifies the type of the sheet that the user wants to print.

Here, with reference to FIG. 7, relationships between print modes of the image forming apparatus 100 and types of sheets to be used for printing by the image forming apparatus 100 will be described. FIG. 7 is a view showing a table Q summarizing prohibition relationships between print modes and sheet types. The table Q is stored in a non-volatile area (for example, the ROM 113, the hard disk 120) of the image forming apparatus 100, and is referred to in the processing shown in FIG. 6.

The print modes include a single-sided mode, an auto-color mode, a full-color mode, a two-color mode, a monochrome mode, a double-sided mode, a staple mode, a punching mode, a folding mode (for each set), a folding mode (for each sheet), a cutting mode, and an insert sheet printing mode. The sheet types include plain paper/plain paper (Eco), thin paper, OHP, an envelope, thick paper 1, thick paper 1+, thick paper 2, thick paper 3, and thick paper 4. "○" is attached to a type of a sheet that is capable of being printed in the print mode. "x" is attached to a type of a sheet that is incapable of being printed in the print mode.

The print mode with "○" attached to all sheet types is a print mode that allows printing on a sheet of any type Hereinafter, such a print mode is referred to as "non-prohibition mode". Whereas, the print mode with "x" attached to a sheet of a specific type is a print mode that prohibits printing on a sheet of a type marked with "x". Hereinafter, such a print mode is referred to as "prohibition mode". In FIG. 7, the non-prohibition mode is a single-sided mode, an auto-color mode, a full-color mode, a two-color mode, and a monochrome mode. Whereas, the prohibition mode is a double-sided mode, the staple mode, the punching mode, the folding mode (for each set), the folding mode (for each sheet), the cutting mode, and the insert sheet printing mode.

Note that the print modes shown in FIG. 7 are merely an example, and the print modes of the image forming apparatus 100 are not limited to this. Further, the types of sheets shown in FIG. 7 are also merely an example, and the types of sheets to be used for printing by the image forming apparatus 100 are not limited to this.

Referring to FIG. 6 again, the controller 110 repeats step S605 until receiving specification of a print mode and specification of a type of a sheet to be used for printing. When specification of a print mode and specification of a type of a sheet to be used for printing are received (YES in step S605), the controller 110 transitions to step S610.

In step S610, the controller 110 refers to the table Q and determines whether or not there is prohibition between the specified print mode and the specified sheet type. When a combination of the specified print mode and the specified sheet type corresponds to a combination marked with "x" in the table Q, the controller 110 determines that there is prohibition between the specified print mode and the specified sheet type. Whereas, when the combination of the specified print mode and the specified sheet type corresponds to a combination marked with "○" in the table Q, the controller 110 determines that there is no prohibition between the specified print mode and the specified sheet type.

When there is prohibition between the specified print mode and the specified sheet type (YES in step S610), the controller 110 transitions to step S635. Whereas, when there is no prohibition between the specified print mode and the specified sheet type (NO in step S610), the controller 110 transitions to step S615.

In step S615, the controller 110 determines whether or not an instruction to start printing has been received. The user can give an instruction to start printing on the operation panel 70. The controller 110 repeats step S615 until receiving an instruction to start printing, and transitions to step S620 when receiving the instruction to start printing (YES in step S615).

In step S620, the controller 110 determines whether or not the specified print mode is the prohibition mode. When the specified print mode is the prohibition mode (YES in step S620), the controller 110 transitions to step S625. Whereas, when the specified print mode is not the prohibition mode (NO in step S620), the controller 110 transitions to step S630.

In step S625, the controller 110 executes a printing process involving sheet type detection. In this process, a sheet type is detected before the printing process, and printing is performed in the specified print mode when the detected sheet type is a type for which printing in the specified print mode is allowed. The process will be described later with reference to FIGS. 8 to 15.

In step S630, the controller 110 executes a normal printing process. The normal printing process is a process of printing in the specified print mode without detecting a sheet type.

In step S635, the controller 110 performs warning display. Specifically, the controller 110 displays on the operation panel 70 that printing on a sheet of the type specified by the user is disabled in the print mode specified by the user. Note that, instead of the warning display or together with the warning display, the fact that printing is disabled may be notified by voice. Further, a sheet type for which printing is prohibited may be grayed out in advance on the operation panel 70 for each print mode.

After step S625, step S630, or step S635, the controller 110 ends the series of processes shown in FIG. 6.

Note that, in the above, a print mode and a type of a sheet to be used for printing are specified on the operation panel 70, but the print mode and the type of the sheet to be used for printing may be specified on a printer driver.

The printing process involving sheet type detection (step S625) will be described with reference to FIGS. 8 to 15. The processing shown in FIGS. 8 to 14 is processing for each print mode classified into the prohibition mode, and the processing shown in FIG. 15 is processing common to all the print modes classified into the prohibition mode. First, with reference to FIGS. 8 to 10, a description will be given to a printing process involving sheet type detection (step S625) when a specified print mode is the staple mode.

Figure 8:
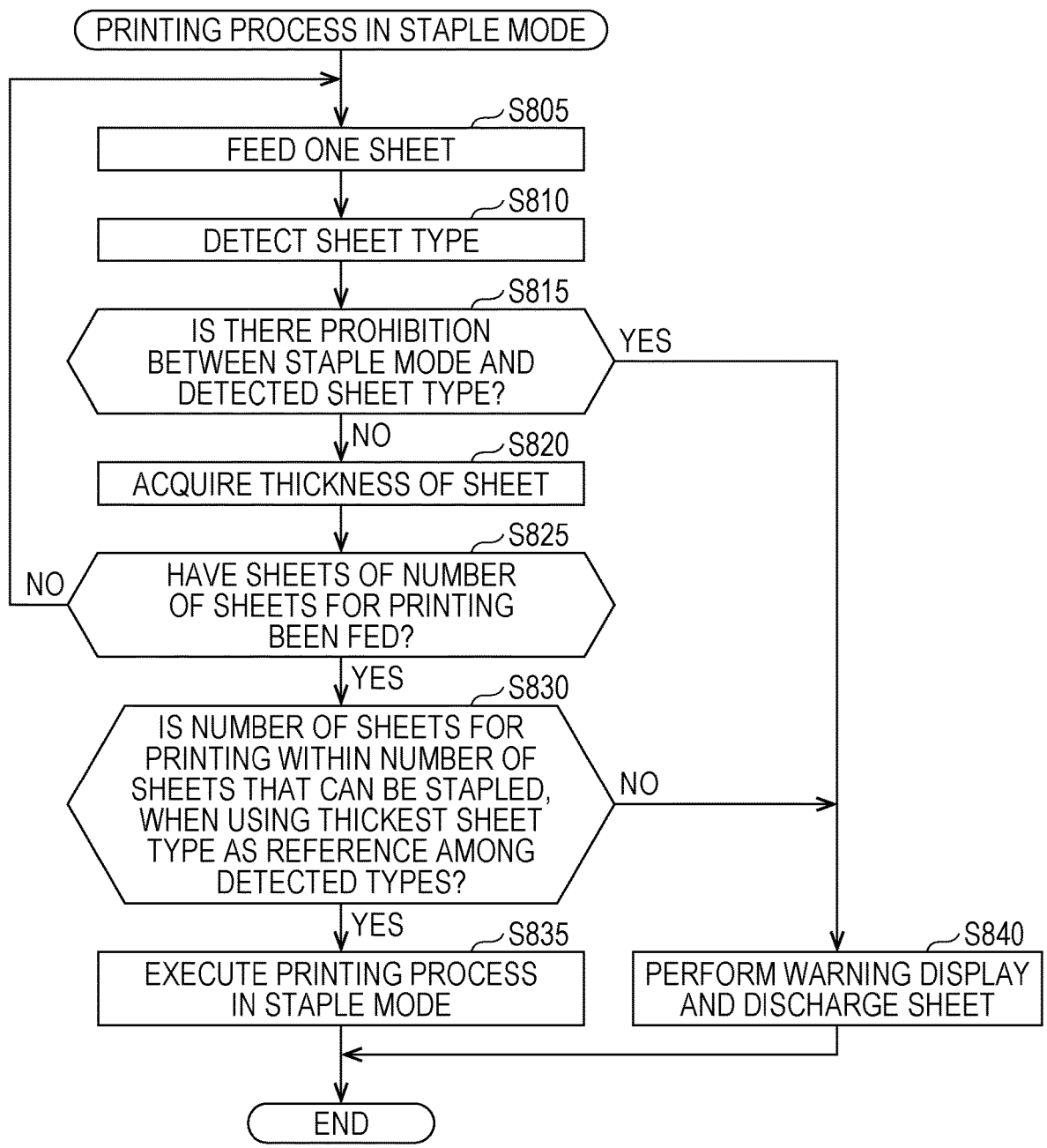
FIG. 8 is a flowchart showing a first example of a printing process involving sheet type detection when a specified print mode is a staple mode.

FIG. 8 is a flowchart showing a first example of the printing process involving sheet type detection when a specified print mode is the staple mode. The processing shown in FIG. 8 is realized by the CPU 111 executing a predetermined program stored in the ROM 113.

First, the controller 110 refers to the table P and sends one sheet from a tray corresponding to a specified sheet type to the sheet conveyance path 55 (step S805). Specifically, as the controller 110 rotates a roller, one sheet is sent to the sheet conveyance path 55.

Next, the controller 110 detects a type of the sheet sent to the sheet conveyance path 55 (step S810). Specifically, the sensor 50 detects the sheet type on the basis of an instruction from the controller 110.

Next, the controller 110 refers to the table Q and determines whether or not there is prohibition between the staple mode and the detected sheet type (step S815). When a combination of the staple mode and the detected sheet type corresponds to a combination marked with "x" in the table Q, the controller 110 determines that there is prohibition between the staple mode and the detected sheet type. Whereas, when the combination of the staple mode and the detected sheet type corresponds to a combination marked with "o" in the table Q, the controller 110 determines that there is no prohibition between the staple mode and the detected sheet type.

When there is prohibition between the staple mode and the detected sheet type (YES in step S815), the controller 110 transitions to step S840. Whereas, when there is no prohibition between the staple mode and the detected sheet type (NO in step S815), the controller 110 transitions to step S820.

In step S820, the controller 110 acquires a thickness of the sheet whose type has been detected in step S810. In the image forming apparatus 100, a sheet thickness is registered for each sheet type. The controller 110 acquires a thickness corresponding to the type detected in step S810 from the registered thicknesses.

Next, the controller 110 determines whether or not sheets of the number of sheets for printing have been fed (step S825). When sheets of the number of sheets for printing have been fed (YES in step S825), the controller 110 transitions to step S830. Whereas, when sheets of the number of sheets for printing have not been fed yet (NO in step S825), the controller 110 transitions to step S805.

In step S830, the controller 110 determine whether the number of sheets for printing is within the number of sheets that can be stapled, while using a thickest sheet type as a reference among types detected in step S810. In the image forming apparatus 100, the number of sheets that can be stapled is registered for each sheet type. The controller 110 acquires the number of sheets corresponding to the thickest type among types detected in step S810 from the registered numbers of sheets that can be stapled, and determines whether or not the number of sheets for printing is within that number of sheets. While using the thickest sheet type as a reference among types detected in step S810, when the number of sheets for printing is within the number of sheets that can be stapled (YES in step S830), the controller 110 transitions to step S835. Whereas, while using the thickest sheet type as a reference among types detected in step S810, when the number of sheets for printing exceeds the number of sheets that can be stapled (NO in step S830), the controller 110 transitions to step S840.

In step S835, the controller 110 executes the printing process in the staple mode.

In step S840, the controller 110 discharges the sheet fed in step S805 to the sheet discharging tray 8 in a blank state without executing the printing process, and performs warning display. Specifically, when the controller 110 determines in step S815 that there is prohibition between the staple mode and the detected sheet type, the controller 110 displays on the operation panel 70 that a sheet type for which printing in the staple mode is prohibited has been detected. When the controller 110 determines in step S830 that the number of sheets for printing exceeds the number of sheets that can be stapled, the controller 110 displays on the operation panel 70 that the number of sheets for printing exceeds the number of sheets that can be stapled.

Note that, in step S840, the controller 110 may display a message on the operation panel 70 to prompt replacement of sheets, and execute the printing process in the staple mode when the replacement of sheets is performed. Further, instead of the warning display, or together with the warning display, the warning content above may be notified by voice. Further, in step S840, the controller 110 may discharge the sheet fed in step S805 to the sheet discharging tray 8 in a blank state without the warning display. Further, in step S840, the controller 110 may return the sheet to the sheet feeding tray 401, 402, 403, or 404 or the manual feeding tray 405 without discharging the sheet to the sheet discharging tray 8.

After step S835 or step S840, the controller 110 ends the series of processes shown in FIG. 8.

Through the series of processes shown in FIG. 8, when the print mode specified by the user is the staple mode, a type of a fed sheet is detected by the sensor 50. When the detected type is a type for which printing in the staple mode is prohibited, the printing process is not executed. Whereas, when the detected type is allowed for printing in the staple mode and the number of sheets for printing is within the number of sheets that can be stapled, the printing process is executed in the print mode specified by the user, that is, the staple mode.

Figure 9:
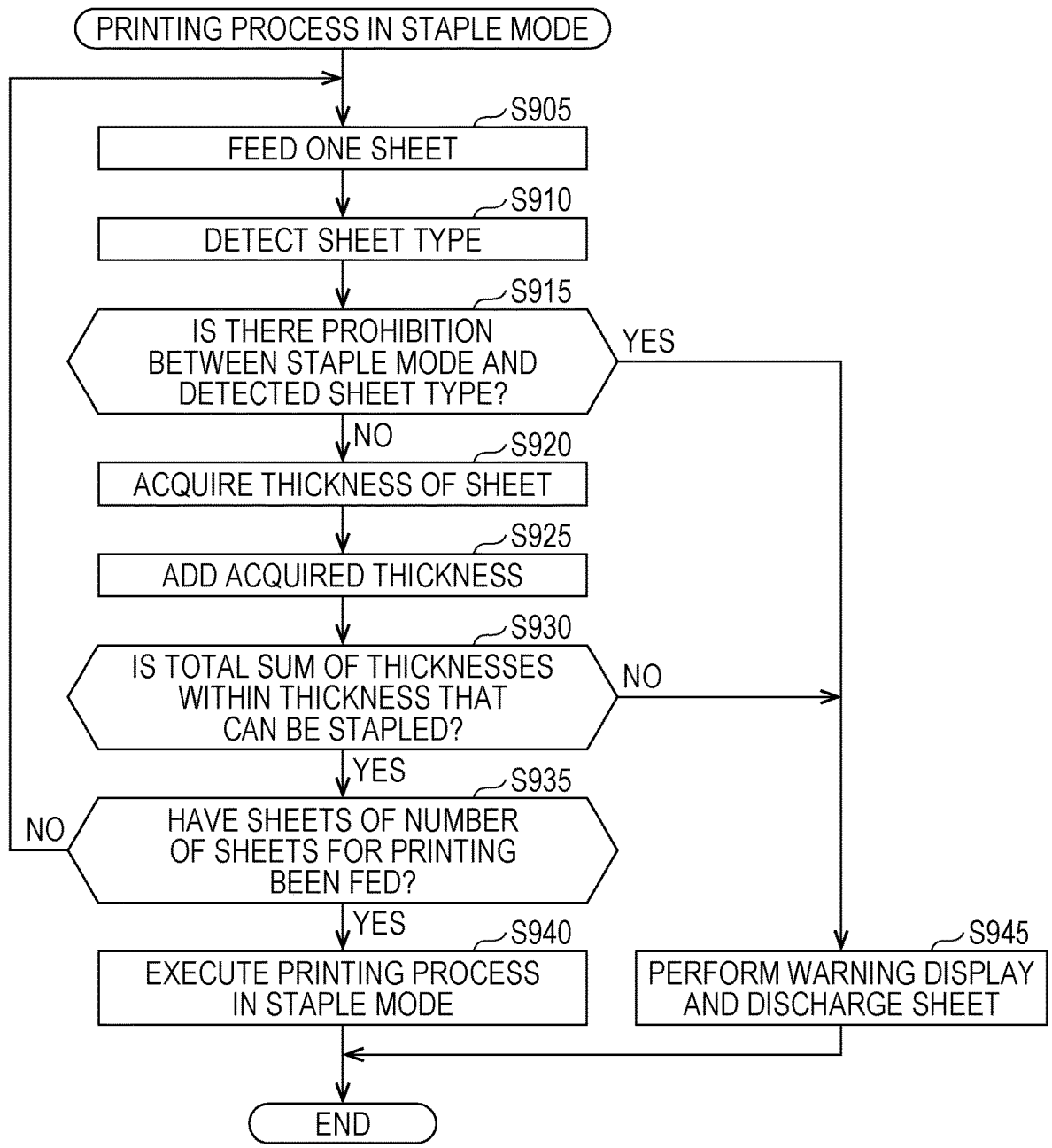
FIG. 9 is a flowchart showing a second example of the printing process involving sheet type detection when a specified print mode is the staple mode.

FIG. 9 is a flowchart showing a second example of the printing process involving sheet type detection when a specified print mode is the staple mode. The processing shown in FIG. 9 is realized by the CPU 111 executing a predetermined program stored in the ROM 113.

First, the controller 110 refers to the table P and sends one sheet from a tray corresponding to a specified sheet type to the sheet conveyance path 55 (step S905). Specifically, as the controller 110 rotates a roller, one sheet is sent to the sheet conveyance path 55.

Next, the controller 110 detects a type of the sheet sent to the sheet conveyance path 55 (step S910). Specifically, the sensor 50 detects the sheet type on the basis of an instruction from the controller 110.

Next, the controller 110 refers to the table Q and determines whether or not there is prohibition between the staple mode and the detected sheet type (step S915). When a combination of the staple mode and the detected sheet type corresponds to a combination marked with "x" in the table Q, the controller 110 determines that there is prohibition between the staple mode and the detected sheet type. Whereas, when the combination of the staple mode and the detected sheet type corresponds to a combination marked with "o" in the table Q, the controller 110 determines that there is no prohibition between the staple mode and the detected sheet type.

When there is prohibition between the staple mode and the detected sheet type (YES in step S915), the controller 110 transitions to step S945. Whereas, when there is no prohibition between the staple mode and the detected sheet type (NO in step S915), the controller 110 transitions to step S920.

In step S920, the controller 110 acquires a thickness of the sheet whose type has been detected in step S910. In the image forming apparatus 100, a sheet thickness is registered for each sheet type. The controller 110 acquires a thickness corresponding to the type detected in step S910 from the registered thicknesses.

Next, the controller 110 adds the thickness acquired in step S920 (step S925).

Next, the controller 110 determines whether or not a total sum of the thicknesses added in step S925 is within a thickness that can be stapled (step S930). When the total sum of the thicknesses added in step S925 is within the thickness that can be stapled (YES in step S930), the controller 110 transitions to step S935. Whereas, when the total sum of the thicknesses added in step S925 exceeds the thickness that can be stapled (NO in step S930), the controller 110 transitions to step S945.

In step S935, the controller 110 determines whether or not sheets of the number of sheets for printing have been fed. When sheets of the number of sheets for printing have been fed (YES in step S935), the controller 110 transitions to step S940. Whereas, when sheets of the number of sheets for printing have not been fed yet (NO in step S935), the controller 110 transitions to step S905.

In step S940, the controller 110 executes the printing process in the staple mode.

In step S945, the controller 110 discharges the sheet fed in step S905 to the sheet discharging tray 8 in a blank state without executing the printing process, and performs warning display. Specifically, when the controller 110 determines in step S915 that there is prohibition between the staple mode and the detected sheet type, the controller 110 displays on the operation panel 70 that a sheet type for which printing in the staple mode is prohibited has been detected. When the controller 110 determines in step S930 that the total sum of the thicknesses added in step S925 exceeds the thickness that can be stapled, the controller 110 displays on the operation panel 70 that the thickness that can be stapled is exceeded.

Note that, in step S945, the controller 110 may display a message on the operation panel 70 to prompt replacement of sheets, and execute the printing process in the staple mode when the replacement of sheets is performed. Further, instead of the warning display, or together with the warning display, the warning content above may be notified by voice. Further, in step S945, the controller 110 may discharge the sheet fed in step S905 to the sheet discharging tray 8 in a blank state without the warning display. Further, in step S945, the controller 110 may return the sheet to the sheet feeding tray 401, 402, 403, or 404 or the manual feeding tray 405 without discharging the sheet to the sheet discharging tray 8.

After step S940 or step S945, the controller 110 ends the series of processes shown in FIG. 9.

Through the series of processes shown in FIG. 9, when the print mode specified by the user is the staple mode, a type of a fed sheet is detected by the sensor 50. When the detected type is a type for which printing in the staple mode is prohibited, the printing process is not executed. Whereas, when the detected type is allowed for printing in the staple mode, and a thickness of sheets of the number of sheets for printing is within a thickness of sheets that can be stapled, the printing process is executed in the print mode specified by the user, that is, the staple mode.

Figure 10:
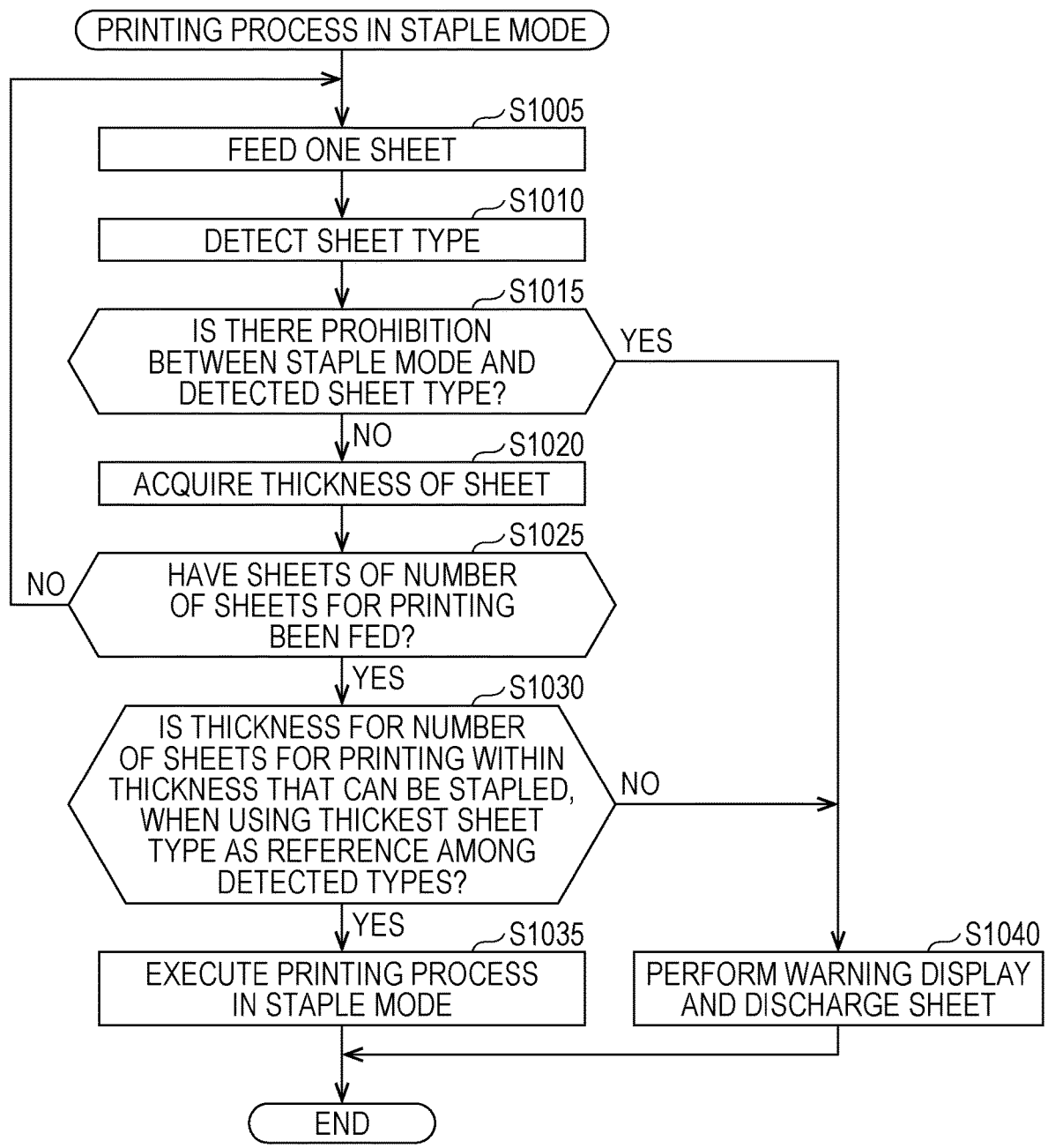
FIG. 10 is a flowchart showing a third example of the printing process involving sheet type detection when a specified print mode is the staple mode.

FIG. 10 is a flowchart showing a third example of the printing process involving sheet type detection when a specified print mode is the staple mode. The processing shown in FIG. 10 is realized by the CPU 111 executing a predetermined program stored in the ROM 113.

First, the controller 110 refers to the table P and sends one sheet from a tray corresponding to a specified sheet type to the sheet conveyance path 55 (step S1005). Specifically, as the controller 110 rotates a roller, one sheet is sent to the sheet conveyance path 55.

Next, the controller 110 detects a type of the sheet sent to the sheet conveyance path 55 (step S1010). Specifically, the sensor 50 detects the sheet type on the basis of an instruction from the controller 110.

Next, the controller 110 refers to the table Q and determines whether or not there is prohibition between the staple mode and the detected sheet type (step S1015). When a combination of the staple mode and the detected sheet type corresponds to a combination marked with "x" in the table Q, the controller 110 determines that there is prohibition between the staple mode and the detected sheet type. Whereas, when the combination of the staple mode and the detected sheet type corresponds to a combination marked with "∘" in the table Q, the controller 110 determines that there is no prohibition between the staple mode and the detected sheet type.

When there is prohibition between the staple mode and the detected sheet type (YES in step S1015), the controller 110 transitions to step S1040. Whereas, when there is no prohibition between the staple mode and the detected sheet type (NO in step S1015), the controller 110 transitions to step S1020.

In step S1020, the controller 110 acquires a thickness of the sheet whose type has been detected in step S1010. In the image forming apparatus 100, a sheet thickness is registered for each sheet type. The controller 110 acquires a thickness corresponding to the type detected in step S1010 from the registered thicknesses.

Next, the controller 110 determines whether or not sheets of the number of sheets for printing have been fed (step S1025). When sheets of the number of sheets for printing have been fed (YES in step S1025), the controller 110 transitions to step S1030. Whereas, when sheets of the number of sheets for printing have not been fed yet (NO in step S1025), the controller 110 transitions to step S1005.

In step S1030, while using a thickest sheet type as a reference among types detected in step S1010, the controller 110 determines whether or not a thickness for the number of sheets for printing is within a thickness that can be stapled. While using the thickest sheet type as a reference among types detected in step S1010, when the thickness for the number of sheets for printing is within the thickness that can be stapled (YES in step S1030), the controller 110 transitions to step S1035. Whereas, while using the thickest sheet type as a reference among types detected in step S1010, when the thickness for the number of sheets for printing exceeds the thickness that can be stapled (NO in step S1030), the controller 110 transitions to step S1040.

In step S1035, the controller 110 executes the printing process in the staple mode.

In step S1040, the controller 110 discharges the sheet fed in step S1005 to the sheet discharging tray 8 in a blank state without executing the printing process, and performs warning display. Specifically, when the controller 110 determines in step S1015 that there is prohibition between the staple mode and the detected sheet type, the controller 110 displays on the operation panel 70 that a sheet type for which printing in the staple mode is prohibited has been detected. When the controller 110 determines in step S1030 that the thickness of sheets of the number of sheets for printing exceeds the thickness that can be stapled, the controller 110 displays on the operation panel 70 that the thickness of sheets of the number of sheets for printing exceeds the thickness that can be stapled.

Note that, in step S1040, the controller 110 may display a message on the operation panel 70 to prompt replacement of sheets, and execute the printing process in the staple mode when the sheets are replaced. Further, instead of the warning display, or together with the warning display, the warning content above may be notified by voice. Further, in step S1040, the controller 110 may discharge the sheet fed in step S1005 to the sheet discharging tray 8 in a blank state without the warning display. Further, in step S1040, the controller 110 may return the sheet to the sheet feeding tray 401, 402, 403, or 404 or the manual feeding tray 405 without discharging the sheet to the sheet discharging tray 8.

After step S1035 or step S1040, the controller 110 ends the series of processes shown in FIG. 10.

Through the series of processes shown in FIG. 10, when the print mode specified by the user is the staple mode, a type of a fed sheet is detected by the sensor 50. When the detected type is a type for which printing in the staple mode is prohibited, the printing process is not executed. Whereas, when the detected type is allowed for printing in the staple mode, and a thickness of sheets of the number of sheets for printing is within a thickness of sheets that can be stapled, the printing process is executed in the print mode specified by the user, that is, the staple mode.

Figure 11:
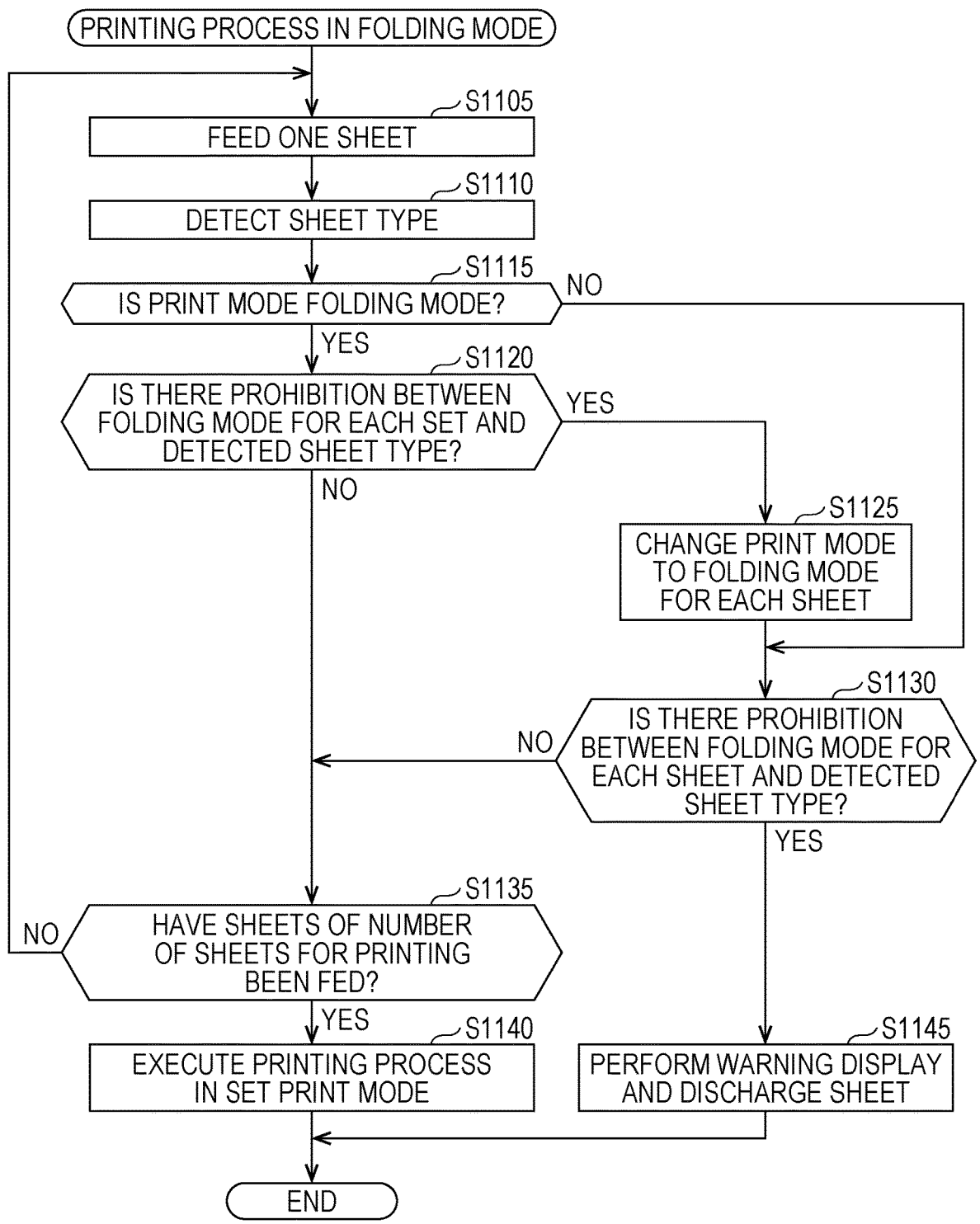
FIG. 11 is a flowchart showing a printing process involving sheet type detection when a specified print mode is a folding mode.

With reference to FIG. 11, a description will be given to a printing process involving sheet type detection (step S625) when a specified print mode is the folding mode.

FIG. 11 is a flowchart showing the printing process involving sheet type detection when a specified print mode is the folding mode. The processing shown in FIG. 11 is realized by the CPU 111 executing a predetermined program stored in the ROM 113.

First, the controller 110 refers to the table P and sends one sheet from a tray corresponding to a specified sheet type to the sheet conveyance path 55 (step S1105). Specifically, as the controller 110 rotates a roller, one sheet is sent to the sheet conveyance path 55.

Next, the controller 110 detects a type of the sheet sent to the sheet conveyance path 55 (step S1110). Specifically, the sensor 50 detects the sheet type on the basis of an instruction from the controller 110.

Next, the controller 110 determines whether or not the specified print mode is a folding mode for each set among the folding modes (step S1115). When the specified print mode is the folding mode for each set among the folding modes (YES in step S1115), the controller 110 transitions to step S1120. Whereas, when the specified print mode is not the folding mode for each set among the folding modes (NO in step S1115), the controller 110 transitions to step S1130.

In step S1120, the controller 110 refers to the table Q and determines whether or not there is prohibition between the folding mode for each set and the detected sheet type. When a combination of the folding mode for each set and the detected sheet type corresponds to a combination marked with "x" in the table Q, the controller 110 determines that there is prohibition between the folding mode for each set and the detected sheet type. Whereas, when the combination of the folding mode for each set and the detected sheet type corresponds to a combination marked with "○" in the table Q, the controller 110 determines that there is no prohibition between the folding mode for each set and the detected sheet type.

When there is prohibition between the folding mode for each set and the detected sheet type (YES in step S1120), the controller 110 transitions to step S1125. Whereas, when there is no prohibition between the folding mode for each set and the detected sheet type (NO in step S1120), the controller 110 transitions to step S1135.

In step S1125, the controller 110 changes the print mode from the folding mode for each set to a folding mode for each sheet.

Next, the controller 110 refers to the table Q and determines whether or not there is prohibition between the folding mode for each sheet and the detected sheet type (step S1130). When a combination of the folding mode for each sheet and the detected sheet type corresponds to a combination marked with "x" in the table Q, the controller 110 determines that there is prohibition between the folding mode for each sheet and the detected sheet type. Whereas, when the combination of the folding mode for each sheet and the detected sheet type corresponds to a combination marked with "○" in the table Q, the controller 110 determines that there is no prohibition between the folding mode for each sheet and the detected sheet type.

When there is prohibition between the folding mode for each sheet and the detected sheet type (YES in step S1130), the controller 110 transitions to step S1145. Whereas, when there is no prohibition between the folding mode for each sheet and the detected sheet type (NO in step S1130), the controller 110 transitions to step S1135.

In step S1135, the controller 110 determines whether or not sheets of the number of sheets for printing have been fed (step S1135). When sheets of the number of sheets for printing have been fed (YES in step S1135), the controller 110 transitions to step S1140. Whereas, when sheets of the number of sheets for printing have not been fed yet (NO in step S1135), the controller 110 transitions to step S1105.

In step S1140, the controller 110 executes the printing process in the set print mode. Specifically, when the folding mode for each set among the folding modes is set, the controller 110 executes the printing process in the folding mode for each set. Whereas, when the folding mode for each sheet among the folding modes is set, the controller 110 executes the printing process in the folding mode for each sheet.

In step S1145, the controller 110 discharges the sheet fed in step S1105 to the sheet discharging tray 8 in a blank state without executing the printing process, and performs warning display. Specifically, when the print mode specified by the user is the folding mode for each sheet, the controller 110 displays on the operation panel 70 that a sheet type for which printing in the folding mode for each sheet is prohibited has been detected. When the print mode specified by the user is the folding mode for each set, the controller 110 displays on the operation panel 70 that a sheet type for which printing in the folding mode for each set is prohibited has been detected.

Note that, in step S1145, the controller 110 may display a message on the operation panel 70 to prompt replacement of sheets, and execute the printing process in the set print mode when the sheets are replaced. Further, instead of the warning display, or together with the warning display, the warning content above may be notified by voice. Further, in step S1145, the controller 110 may discharge the sheet fed in step S1105 to the sheet discharging tray 8 in a blank state without the warning display. Further, in step S1145, the controller 110 may return the sheet to the sheet feeding tray 401, 402, 403, or 404 or the manual feeding tray 405 without discharging the sheet to the sheet discharging tray 8.

After step S1140 or step S1145, the controller 110 ends the series of processes shown in FIG. 11.

According to the series of processes shown in FIG. 11, when the print mode specified by the user is one of the folding mode for each sheet and the folding mode for each set, a type of a fed sheet is detected by the sensor 50.

When the print mode specified by the user is the folding mode for each sheet, and the detected type is a type for which printing in the folding mode for each sheet is prohibited, the printing process is not executed. When the print mode specified by the user is the folding mode for each sheet, and the detected type is a type for which printing in the folding mode for each sheet is allowed, the printing process is executed in the print mode specified by the user, that is, the folding mode for each sheet.

When the print mode specified by the user is the folding mode for each set, and the detected type is a type for which printing in the folding mode for each set is prohibited, but printing in the folding mode for each sheet is allowed, the printing process is executed in the folding mode for each sheet. When the print mode specified by the user is the folding mode for each set, and the detected type is a type for which printing is prohibited in both the folding mode for each set and the folding mode for each sheet, the printing process is not executed.

Figure 12:
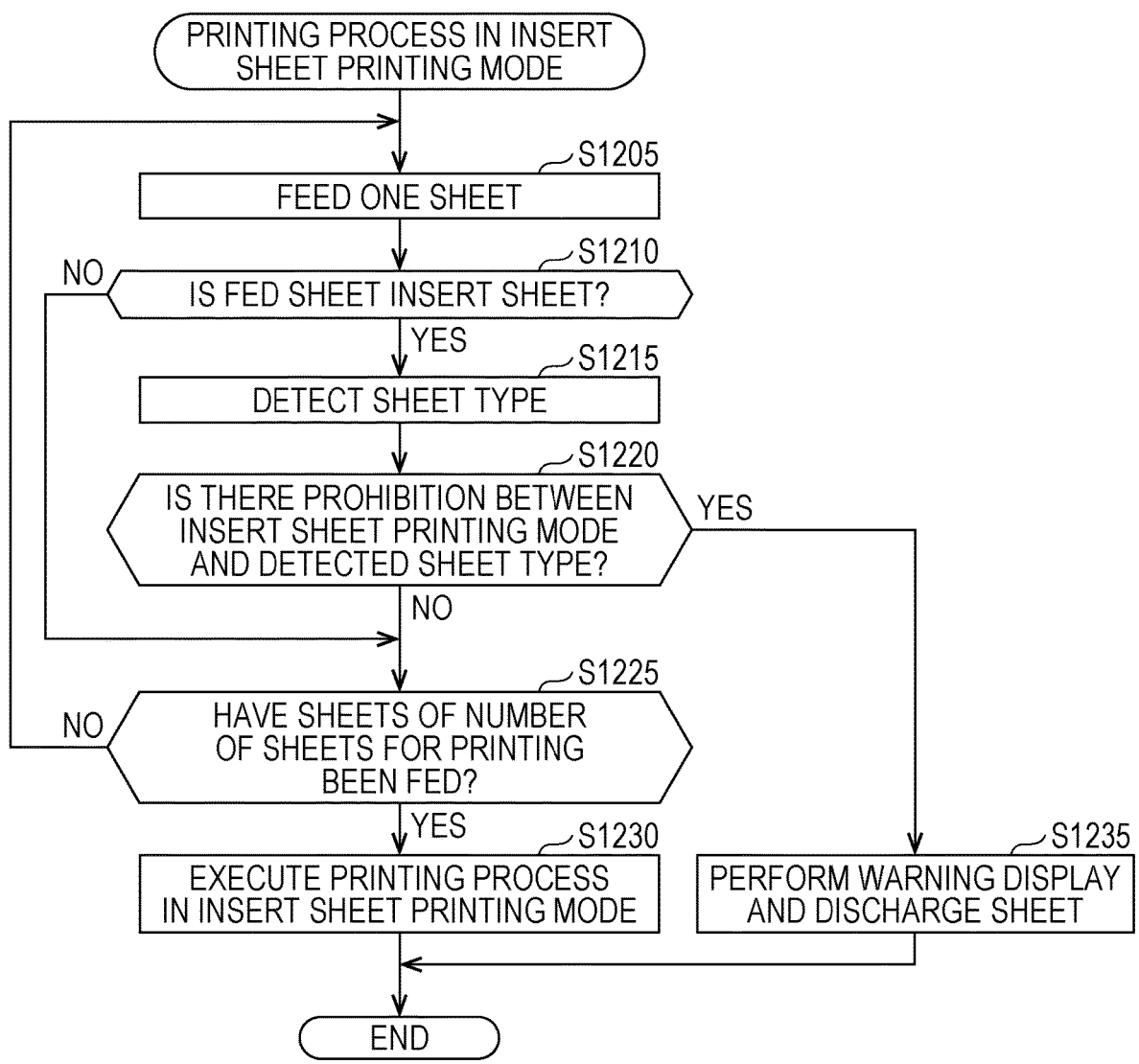
FIG. 12 is a flowchart showing a printing process involving sheet type detection when a specified print mode is an insert sheet printing mode.

With reference to FIG. 12, a description will be given to a printing process involving sheet type detection (step S625) when a specified print mode is the insert sheet printing mode.

FIG. 12 is a flowchart showing the printing process involving sheet type detection when a specified print mode is the insert sheet printing mode. The processing shown in FIG. 12 is realized by the CPU 111 executing a predetermined program stored in the ROM 113.

First, the controller 110 refers to the table P and sends one sheet from a tray corresponding to a specified sheet type to the sheet conveyance path 55 (step S1205). Specifically, as the controller 110 rotates a roller, one sheet is sent to the sheet conveyance path 55.

Next, the controller 110 determines whether or not the fed sheet is an insert sheet (step S1210). When the fed sheet is an insert sheet (YES in step S1210), the controller 110 transitions to step S1215. Whereas, when the fed sheet is not an insert sheet (NO in step S1210), the controller 110 transitions to step S1225.

In step S1215, the controller 110 detects a type of the sheet sent to the sheet conveyance path 55, that is, a type of the insert sheet. Specifically, the sensor 50 detects the sheet type on the basis of an instruction from the controller 110.

Next, the controller 110 refers to the table Q and determines whether or not there is prohibition between the insert sheet printing mode and the detected sheet type (step S1220). When a combination of the insert sheet printing mode and the detected sheet type corresponds to a combination marked with "x" in the table Q, the controller 110 determines that there is prohibition between the insert sheet printing mode and the detected sheet type. Whereas, when the combination of the insert sheet printing mode and the detected sheet type corresponds to a combination marked with "○" in the table Q, the controller 110 determines that there is no prohibition between the insert sheet printing mode and the detected sheet type.

When there is prohibition between the insert sheet printing mode and the detected sheet type (YES in step S1220), the controller 110 transitions to step S1235. Whereas, when there is no prohibition between the insert sheet printing mode and the detected sheet type (NO in step S1220), the controller 110 transitions to step S1225.

In step S1225, the controller 110 determines whether or not sheets of the number of sheets for printing have been fed. When sheets of the number of sheets for printing have been fed (YES in step S1225), the controller 110 transitions to step S1230. Whereas, when sheets of the number of sheets for printing have not been fed yet (NO in step S1225), the controller 110 transitions to step S1205.

In step S1230, the controller 110 executes the printing process in the insert sheet printing mode.

In step S1235, the controller 110 discharges the sheet fed in step S1205 to the sheet discharging tray 8 in a blank state without executing the printing process, and performs warning display. Specifically, the controller 110 displays on the operation panel 70 that a sheet type for which printing in the insert sheet printing mode is prohibited has been detected.

Note that, in step S1235, the controller 110 may display a message on the operation panel 70 to prompt replacement of sheets, and execute the printing process in the insert sheet printing mode when the sheets are replaced. Further, instead of the warning display, or together with the warning display, the warning content above may be notified by voice. Further, in step S1235, the controller 110 may discharge the sheet fed in step S1205 to the sheet discharging tray 8 in a blank state without the warning display. Further, in step S1235, the controller 110 may return the sheet to the sheet feeding tray 401, 402, 403, or 404 or the manual feeding tray 405 without discharging the sheet to the sheet discharging tray 8.

After step S1230 or step S1235, the controller 110 ends the series of processes shown in FIG. 12.

According to the series of processes shown in FIG. 12, when the print mode specified by the user is the insert sheet printing mode, and a fed sheet is an insert sheet, a type of a fed sheet is detected by the sensor 50. When the detected type is a type for which printing in the insert sheet printing mode is prohibited, the printing process is not executed. Whereas, when the detected type is a type for which printing in the insert sheet printing mode is allowed, the printing process is executed in the print mode specified by the user, that is, the insert sheet printing mode.

Figure 13:
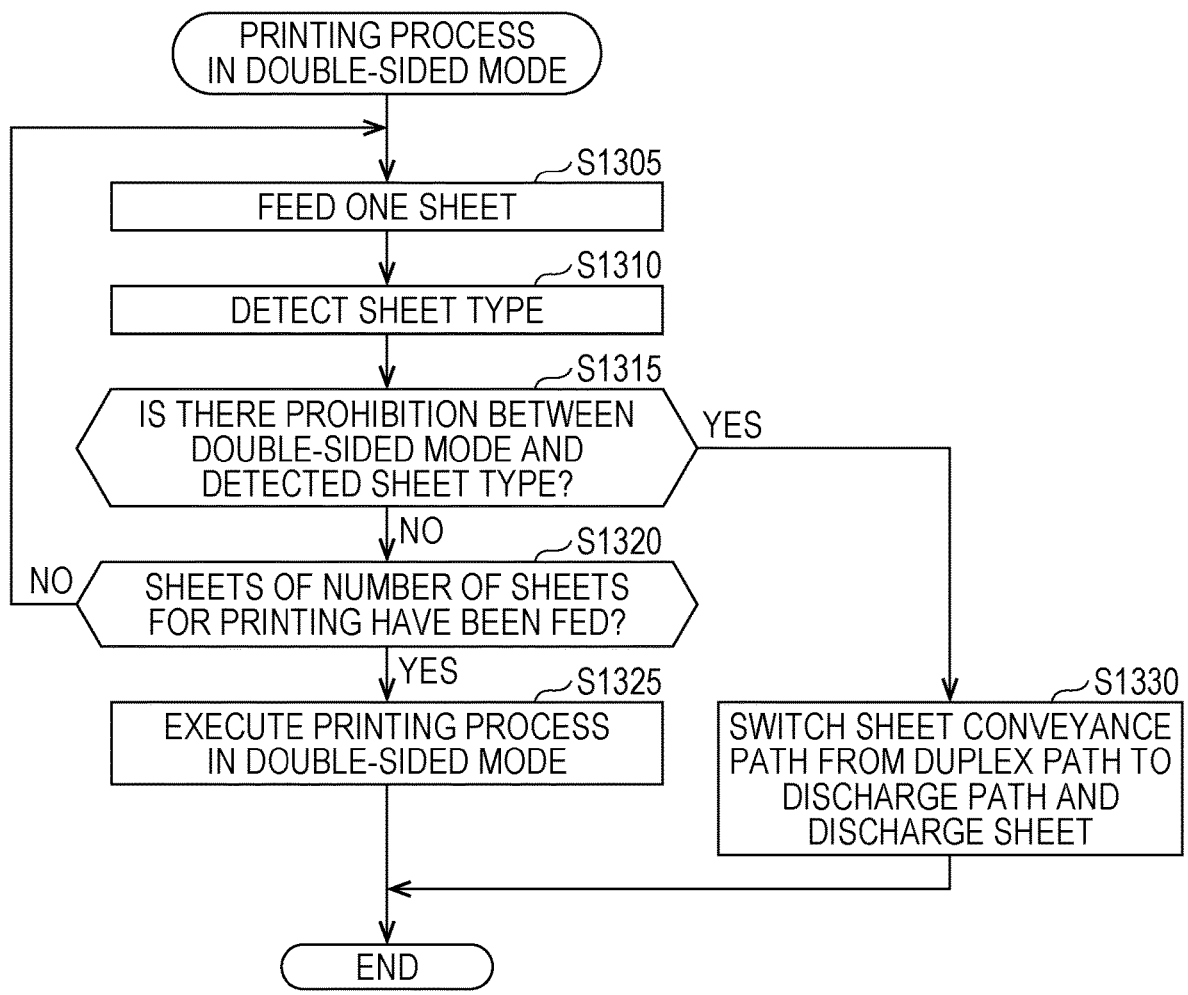
FIG. 13 is a flowchart showing a printing process involving sheet type detection when a specified print mode is a double-sided mode.

With reference to FIG. 13, a description will be given to a printing process involving sheet type detection (step S625) when a specified print mode is the double-sided mode.

FIG. 13 is a flowchart showing the printing process involving sheet type detection when a specified print mode is the double-sided mode. The processing shown in FIG. 13 is realized by the CPU 111 executing a predetermined program stored in the ROM 113.

First, the controller 110 refers to the table P and sends one sheet from a tray corresponding to a specified sheet type to the sheet conveyance path 55 (step S1305). Specifically, as the controller 110 rotates a roller, one sheet is sent to the sheet conveyance path 55.

Next, the controller 110 detects a type of the sheet sent to the sheet conveyance path 55 (step S1310). Specifically, the sensor 50 detects the sheet type on the basis of an instruction from the controller 110.

Next, the controller 110 refers to the table Q and determines whether or not there is prohibition between the double-sided mode and the detected sheet type (step S1315). When a combination of the double-sided mode and the detected sheet type corresponds to a combination marked with "x" in the table Q, the controller 110 determines that there is prohibition between the double-sided mode and the detected sheet type. Whereas, when the combination of the double-sided mode and the detected sheet type corresponds to a combination marked with "○" in the table Q, the controller 110 determines that there is no prohibition between the double-sided mode and the detected sheet type.

When there is prohibition between the double-sided mode and the detected sheet type (YES in step S1315), the controller 110 transitions to step S1330. Whereas, when there is no prohibition between the double-sided mode and the detected sheet type (NO in step S1315), the controller 110 transitions to step S1320.

In step S1320, the controller 110 determines whether or not sheets of the number of sheets for printing have been fed. When sheets of the number of sheets for printing have been fed (YES in step S1320), the controller 110 transitions to step S1325. Whereas, when sheets of the number of sheets for printing have not been fed yet (NO in step S1320), the controller 110 transitions to step S1305.

In step S1325, the controller 110 executes the printing process in the double-sided mode.

In step S1330, the controller 110 switches the sheet conveyance path 55 from a duplex path to a discharge path without executing the printing process, and discharges the sheet fed in step S1305 to the sheet discharging tray 8 in a blank state.

Note that, in step S1330, the controller 110 may return the sheet to the sheet feeding tray 401, 402, 403, or 404 or the manual feeding tray 405 without discharging the sheet to the sheet discharging tray 8. Further, in step S1330, the controller 110 may perform warning display together with the sheet discharge. For example, the controller 110 may display on the operation panel 70 that a sheet type for which printing in the double-sided mode is prohibited has been detected. Further, the controller 110 may display a message on the operation panel 70 to prompt replacement of sheets, and execute the printing process in the double-sided mode when the sheets are replaced. Further, instead of the warning display, or together with the warning display, the warning content above may be notified by voice.

After step S1325 or step S1330, the controller 110 ends the series of processes shown in FIG. 13.

Through the series of processes shown in FIG. 13, when the print mode specified by the user is the double-sided mode, a type of a fed sheet is detected by the sensor 50. When the detected type is a type for which printing in the double-sided mode is prohibited, the printing process is not executed. Whereas, when the detected type is a type for which printing in the double-sided mode is allowed, the printing process is executed in the print mode specified by the user, that is, the double-sided mode.

Figure 14:
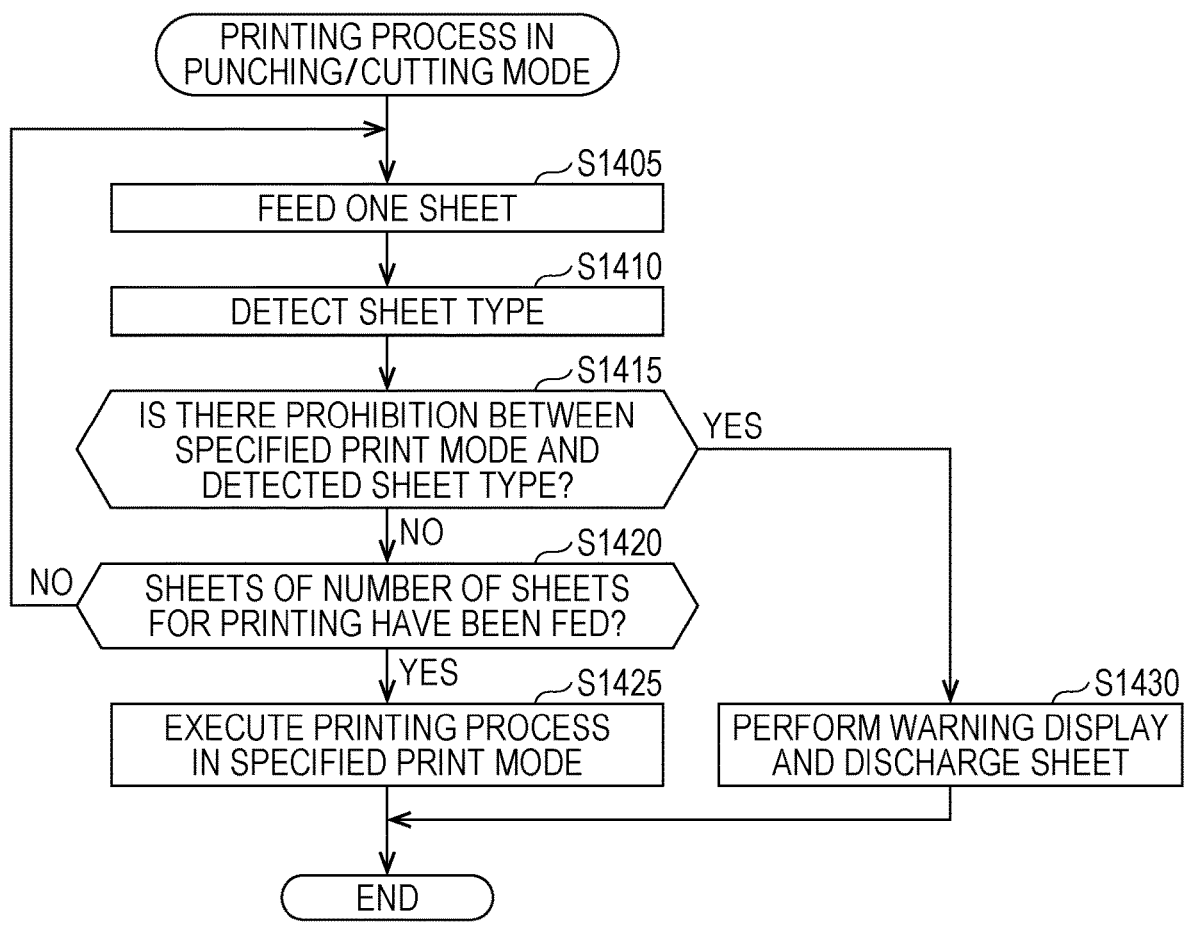
FIG. 14 is a flowchart showing a printing process involving sheet type detection when a specified print mode is a punching mode or a cutting mode.
Figure 15:
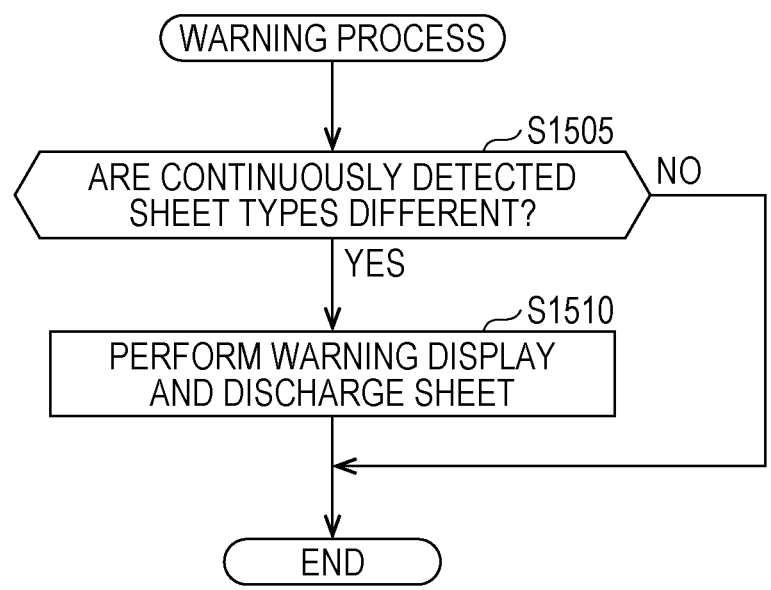
FIG. 15 is a flowchart showing a warning process when a detected sheet type has been changed.

With reference to FIG. 14, a description will be given to a printing process involving sheet type detection (step S625) when a specified print mode is the punching mode or the cutting mode.

FIG. 14 is a flowchart showing the printing process involving sheet type detection when a specified print mode is the punching mode or the cutting mode. The processing shown in FIG. 14 is realized by the CPU 111 executing a predetermined program stored in the ROM 113.

First, the controller 110 refers to the table P and sends one sheet from a tray corresponding to a specified sheet type to the sheet conveyance path 55 (step S1405). Specifically, as the controller 110 rotates a roller, one sheet is sent to the sheet conveyance path 55.

Next, the controller 110 detects a type of the sheet sent to the sheet conveyance path 55 (step S1410). Specifically, the sensor 50 detects the sheet type on the basis of an instruction from the controller 110.

Next, the controller 110 refers to the table Q and determines whether or not there is prohibition between the specified print mode and the detected sheet type (step S1415). When a combination of the specified print mode and the detected sheet type corresponds to a combination marked with "x" in the table Q, the controller 110 determines that there is prohibition between the specified print mode and the detected sheet type. Whereas, when the combination of the specified print mode and the detected sheet type corresponds to a combination marked with "○" in the table Q, the controller 110 determines that there is no prohibition between the specified print mode and the detected sheet type.

When there is prohibition between the specified print mode and the detected sheet type (YES in step S1415), the controller 110 transitions to step S1430. Whereas, when there is no prohibition between the specified print mode and the detected sheet type (NO in step S1415), the controller 110 transitions to step S1420.

In step S1420, the controller 110 determines whether or not sheets of the number of sheets for printing have been fed. When sheets of the number of sheets for printing have been fed (YES in step S1420), the controller 110 transitions to step S1425. Whereas, when sheets of the number of sheets for printing have not been fed yet (NO in step S1420), the controller 110 transitions to step S1405.

In step S1425, the controller 110 executes the printing process in the specified print mode.

In step S1430, the controller 110 discharges the sheet fed in step S1405 to the sheet discharging tray 8 in a blank state without executing the printing process, and performs warning display. Specifically, the controller 110 displays on the operation panel 70 that a sheet type for which printing in the specified print mode is prohibited is detected.

Note that, in step S1430, the controller 110 may display a message on the operation panel 70 to prompt replacement of sheets, and execute the printing process in the specified print mode when the sheets are replaced. Further, instead of the warning display, or together with the warning display, the warning content above may be notified by voice. Further, in step S1430, the controller 110 may discharge the sheet fed in step S1405 to the sheet discharging tray 8 in a blank state without the warning display. Further, in step S1430, the controller 110 may return the sheet to the sheet feeding tray 401, 402, 403, or 404 or the manual feeding tray 405 without discharging the sheet to the sheet discharging tray 8.

After step S1425 or step S1430, the controller 110 ends the series of processes shown in FIG. 14.

Through the series of processes shown in FIG. 14, when the print mode specified by the user is the punching mode or the cutting mode, a type of a fed sheet is detected by the sensor 50. When the detected type is a type for which printing in the print mode specified by the user is prohibited, the printing process is not executed. Whereas, when the detected type is a type for which printing in the print mode specified by the user is allowed, the printing process is executed in the print mode specified by the user, that is, the punching mode or the cutting mode.

With reference to FIG. 15, a description is given to a warning process when a detected sheet type has been changed in the printing process involving sheet type detection (step S625).

FIG. 15 is a flowchart showing a warning process when a detected sheet type has been changed. The processing shown in FIG. 15 is realized by the CPU 111 executing a predetermined program stored in the ROM 113.

First, the controller 110 determines whether or not continuously detected sheet types are different (step S1505). When the continuously detected sheet types are different (YES in step S1505), the controller 110 transitions to step S1510. Whereas, when the continuously detected sheet types are the same (NO in step S1505), the controller 110 ends the series of processes shown in FIG. 15.

In step S1510, without executing the printing process, the controller 110 discharges the sheets fed in step S805, step S905, step S1005, step S1105, step S1205, step S1305, or step S1405 to the sheet discharging tray 8 in a blank state, and performs warning display. Specifically, the controller 110 displays on the operation panel 70 that the continuously detected sheet types are different.

Note that, in step S1510, the controller 110 may display a message on the operation panel 70 to prompt replacement of sheets, and execute the printing process in the specified print mode when the sheets are replaced. Further, instead of the warning display, or together with the warning display, the warning content above may be notified by voice. Further, in step S1510, without the warning display, the controller 110 may discharge the sheet fed in step S805, step S905, step S1005, step S1105, step S1205, step S1305, or step S1405 to the sheet discharging tray 8 in a blank state. Further, in step S1510, the controller 110 may return the sheet to the sheet feeding tray 401, 402, 403, or 404 or the manual feeding tray 405 without discharging the sheet to the sheet discharging tray 8.

Thus, when the print mode specified by the user is the non-prohibition mode, the image forming apparatus 100 performs printing in the print mode specified by the user without detecting a sheet type. Whereas, when the print mode specified by the user is the prohibition mode, the image forming apparatus 100 detects a sheet type, and performs printing in the print mode specified by the user when the detected sheet type is a type for which printing in the print mode specified by the user is allowed.

The prohibition mode is a print mode in which types of printable sheets are limited. When the print mode specified by the user is the prohibition mode, if a sheet of a type incapable of being printed is fed in the print mode and the sheet is printed, the image forming apparatus 100 will be damaged. However, when the print mode specified by the user is the prohibition mode, the image forming apparatus 100 detects a sheet type, and does not perform printing when the detected sheet type is a type for which printing in the print mode specified by the user is prohibited. Therefore, the image forming apparatus 100 is not damaged.

The image forming apparatus 100 detects a sheet type exclusively when the print mode specified by the user is the prohibition mode. Therefore, it is possible to inhibit deterioration of printing productivity as compared with a case of detecting a type of a fed sheet regardless of the print mode specified by the user.

The image forming apparatus 100 determines whether or not the printing process can be executed, based on whether or not a detected sheet type is a type for which printing in the print mode specified by the user is allowed. The determination by the image forming apparatus 100 as to whether or not the printing process can be executed is not based on whether or not the detected sheet type matches a sheet type specified by the user. That is, the image forming apparatus 100 does not stop printing on the grounds of mismatch between the type of the fed sheet and the sheet type specified by the user. In a case where a thickness is slightly different from that of the sheet type specified by the user while the type of the fed sheet is a type for which printing in the print mode specified by the user is allowed, if the printing is interrupted and the printing is not performed unless the sheets are replaced, the convenience for the user is lost.

However, the image forming apparatus 100 does not stop printing on the grounds of mismatch between the type of the fed sheet and the sheet type specified by the user, which can inhibit deterioration of user convenience.

Note that the program executed by the CPU 111 may be stored in the hard disk 120 instead of being stored in the ROM 113 as described above, or may be stored in a storage medium detachable from the image forming apparatus 100. Examples of the storage medium that stores the program include a medium that stores data in a non-volatile manner such as, for example, a compact disk read only memory (CD-ROM), a digital versatile disk read only memory (DVD-ROM), a universal serial bus (USB) memory, a memory card, a floppy disk (FD), a hard disk, a solid state drive (SSD), a magnetic tape, a cassette tape, a magneto optical disc (MO), a MiniDisc (MD), an integrated circuit (IC) card (excluding a memory card), an optical card, a mask read only memory (ROM), an erasable programmable read only memory (EPROM), or an electrically erasable programmable read only memory (EEPROM).

Although embodiments of the present invention have been described and illustrated in detail, the disclosed embodiments are made for purposes of illustration and example only and not limitation. The scope of the present invention should not be interpreted by terms of the description above but by terms of the appended claims, and it is intended to include all modifications within the meaning and scope equivalent to the claims.

What is claimed is:

1. An image forming apparatus comprising:
a reception part that receives specification of a print mode and specification of a sheet type to be used for printing;
a sheet supply part that sends a sheet to a sheet conveyance path;
a detection part that detects a type of a sheet sent to the sheet conveyance path; and
a hardware processor that controls a printing operation, wherein
when a sheet type received by the reception part is a type for which printing in the print mode received by the reception part is allowed, the sheet supply part sends a sheet to the sheet conveyance path,
the hardware processor determines whether or not the print mode received by the reception part is a prohibition mode that prohibits printing on a sheet of a specific type,
when it is determined that the print mode received by the reception part is the prohibition mode, the detection part detects a type of a sheet sent to the sheet conveyance path, and
the hardware processor
executes a printing operation when the print mode received by the reception part is the prohibition mode, and a sheet type detected by the detection part is a type for which printing in the prohibition mode is allowed, and
executes a printing operation without being based on detection by the detection part when the print mode received by the reception part is not the prohibition mode.

2. The image forming apparatus according to claim 1, wherein, when the print mode received by the reception part is the prohibition mode, and a sheet type detected by the detection part is a type for which printing in the prohibition mode is prohibited, the hardware processor issues warning.

3. The image forming apparatus according to claim 1, wherein, when the print mode received by the reception part is the prohibition mode, and a sheet type detected by the detection part is a type for which printing in the prohibition mode is prohibited, the hardware processor discharges a sheet detected by the detection part.

4. The image forming apparatus according to claim 1, wherein the prohibition mode includes a staple mode, and the hardware processor determines whether or not a number of sheets for printing is within a number of sheets that can be stapled, based on a thickest sheet type among types detected by the detection part, when the print mode received by the reception part is the staple mode, and a type of sheets of the number of sheets for printing detected by the detection part is a type for which printing in the staple mode is allowed, executes a printing operation when the number of sheets for printing is within the number of sheets that can be stapled, and discharges a sheet detected by the detection part without executing a printing operation, when the number of sheets for printing exceeds the number of sheets that can be stapled.

5. The image forming apparatus according to claim 1, wherein the prohibition mode includes a staple mode, and the hardware processor determines whether or not a total thickness of sheets detected by the detection part is within a thickness that can be stapled, when the print mode received by the reception part is the staple mode, and a sheet type detected by the detection part is a type for which printing in the staple mode is allowed, executes a printing operation when a total thickness of sheets detected by the detection part is within a thickness that can be stapled, and discharges a sheet detected by the detection part without performing a printing operation, when a total thickness of sheets detected by the detection part exceeds a thickness that can be stapled.

6. The image forming apparatus according to claim 1, wherein the prohibition mode includes a staple mode, and the hardware processor determines whether or not a thickness for a number of sheets for printing is within a thickness that can be stapled, based on a thickest sheet type among types detected by the detection part, when the print mode received by the reception part is the staple mode, and a type of sheets of the number of sheets for printing detected by the detection part is a type for which printing in the staple mode is allowed, executes a printing operation when a thickness for the number of sheets for printing is within a thickness that can be stapled, and discharges a sheet detected by the detection part without executing a printing operation, when a thickness for the number of sheets for printing exceeds a thickness that can be stapled.

7. The image forming apparatus according to claim 1, wherein the prohibition mode includes a folding mode, the folding mode includes a first mode of folding for each set and a second mode of folding for each sheet, and when the print mode received by the reception part is the first mode, and a sheet type detected by the detection part is a type for which printing in the first mode is prohibited, but printing in the second mode is allowed, the hardware processor changes the print mode received by the reception part from the first mode to the second mode to execute a printing operation.

8. The image forming apparatus according to claim 1, wherein the prohibition mode includes an insert sheet printing mode that is for printing on an insert sheet, when the print mode received by the reception part is the insert sheet printing mode, the detection part detects a type of an insert sheet sent to the sheet conveyance path, and the hardware processor executes a printing operation when the print mode received by the reception part is the insert sheet printing mode, and a type of an insert sheet detected by the detection part is a type for which printing in the insert sheet printing mode is allowed, and does not perform a printing operation when the print mode received by the reception part is the insert sheet printing mode, and a type of an insert sheet detected by the detection part is a type for which printing in the insert sheet printing mode is prohibited.

9. The image forming apparatus according to claim 1, wherein the prohibition mode includes a double-sided mode, and the hardware processor executes a printing operation when the print mode received by the reception part is the double-sided mode, and a sheet type detected by the detection part is a type for which printing in the double-sided mode is allowed, and switches the sheet conveyance path from a duplex path to a discharge path, when the print mode received by the reception part is the double-sided mode, and a sheet type detected by the detection part is a type for which printing in the double-sided mode is prohibited.

10. The image forming apparatus according to claim 1, wherein the hardware processor executes at least one of issuing warning or discharging a sheet detected by the detection part, when types of two sheets continuously detected by the detection part are different.

* * * * *